(12) United States Patent
Janiaud et al.

(10) Patent No.: US 6,414,416 B1
(45) Date of Patent: Jul. 2, 2002

(54) MONOLITHIC VIBRATING RATE GYRO STRUCTURE

(75) Inventors: Denis Janiaud, Les Ulis; Olivier Le Traon, Vauhallan; Bernard Le Corre, Meudon la Foret; Serge Muller, Ollainville, all of (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 0 days.

(21) Appl. No.: 09/912,377

(22) Filed: Jul. 26, 2001

Related U.S. Application Data

(63) Continuation of application No. PCT/FR00/00211, filed on Jan. 26, 2000.

(30) Foreign Application Priority Data

Feb. 1, 1999 (FR) .......................................... 99 01138

(51) Int. Cl.$^7$ .............................................. H01L 41/08
(52) U.S. Cl. ........................ 310/321; 310/329; 310/367
(58) Field of Search ............................... 310/321, 324, 310/330–332, 329, 334, 323.01, 367, 368; 73/504.03, 504.16, 514.15, 514.34

(56) References Cited

U.S. PATENT DOCUMENTS

| | | | | |
|---|---|---|---|---|
| 4,538,461 A | * | 9/1985 | Juptner | 73/505 |
| 5,166,571 A | | 11/1992 | Konno et al. | |
| 5,962,786 A | | 10/1999 | Le Troan et al. | |
| 5,998,911 A | * | 12/1999 | Kikuchi et al. | 310/367 |
| 6,018,212 A | * | 1/2000 | Kikuchi et al. | 310/321 |
| 6,046,531 A | * | 4/2000 | Kikuchi et al. | 310/367 |

FOREIGN PATENT DOCUMENTS

| | | |
|---|---|---|
| FR | 2564203 | 5/1984 |
| FR | 2739190 | 9/1995 |

* cited by examiner

Primary Examiner—Mark O. Budd
(74) Attorney, Agent, or Firm—Lawrence E. Laubscher, Sr.

(57) ABSTRACT

A vibrating rate gyro structure machined in a plate of material and comprising a fixed part, a resonator, and a mechanical system connecting the resonator to the fixed part. The mechanical system comprises a first mobile mass part connected to one end of the resonator, a second mobile mass part (4) connected to the resonator and situated in the vicinity of the other end of the resonator, two flexible arms situated on both sides of the resonator and each connecting the first mobile mass part to the second mobile mass part, and two other flexible arms situated on both sides of the resonator and connecting the second mobile mass part to the fixed part.

11 Claims, 5 Drawing Sheets

MONOLITHIC VIBRATING RATE GYRO STRUCTURE

REFERENCE TO RELATED APPLICATION

This application is a continuation application of the PCT Application No. PCT/FR00/00211 filed Jan. 26, 2000; which in turn is based on the French Priority Application No. 99-01138 filed Feb. 1, 1999.

BACKGROUND OF THE INVENTION

1. Field of the Invention

The present invention relates generally to a vibrating rate gyro that can be used to stabilize or guide vehicles, for example, or for automobile navigation.

The invention relates more particularly to a monolithic vibrating rate gyro structure comprising a fixed part, a resonator and a mechanical system linking the resonator to the fixed part and preventing leaks of vibratory mechanical energy from the resonator to the fixed part.

2. Description of the Prior Art

The resonator is intended to operate in two different vibration modes, the vibration directions of the two modes being mutually perpendicular. Accordingly, when the rate gyro is rotating at an angular speed $\vec{\Omega}$ about an axis perpendicular to these two vibration directions, this rotation $\vec{\Omega}$ being referred to a so-called "Galilean" inertial frame of reference, coupling occurs between the two vibration modes of the resonator. The coupling is due to Coriolis accelerations $\vec{\gamma}_c$ that apply at all material points of the resonator and whose analytical expression can be written in the form of the following vector product:

$$\vec{\gamma}_c = 2\vec{\Omega} \wedge \vec{v},$$

$\vec{v}$ being the speed of the material point concerned, expressed in the frame of reference tied to the resonator.

There are several ways to exploit this coupling to measure the angular speed $\vec{\Omega}$.

For example, one of the two vibration modes of the resonator can be maintained in vibration. The rotation at speed $\vec{\Omega}$ then causes vibration in the other mode, with an amplitude proportional to $\Omega$. The value of $\Omega$ can be determined from the measured amplitude, generally converted to the form of an electrical signal.

A second way to exploit the coupling between the two vibration modes of the resonator requires the resonant frequencies of the two modes to be identical, and consists of maintaining them in vibration simultaneously so that one of the modes is in phase quadrature relative to the other mode. Accordingly, if the vibration amplitudes are equal for the two modes, each material point of the resonator traces out a circle in each period of the vibration. The angular frequency $\omega_0$ of that vibration, observed in an inertial frame of reference, is not affected by the rotation at angular speed $\vec{\Omega}$. On the other hand, the angular frequency $\omega$ of the same vibration, as observed by measuring means tied to the resonator, depends on $\Omega$, as expressed by the equation $\omega=\omega_0\pm\Omega$. Thus an oscillator whose frequency variations are representative of rotation speed variations can be made.

A third way to exploit the coupling between the two vibration modes of the resonator requires the resonant frequencies of the two modes to be identical, as before, and consists of maintaining them in vibration simultaneously so that the two modes are in phase relative to each other. Accordingly, the vibrations of each material point of the resonator are contained in a plane. If the system for maintaining the vibrations is designed not to give preference to any particular orientation in that plane relative to the resonator, then the initial orientation, as observed in an inertial frame of reference, is not affected by the rotation at the angular speed $\vec{\Omega}$. On the contrary, the same vibration plane, as observed using means linked to the resonator, undergoes the opposite rotation to that imposed on the resonator. Unlike the first two ways of exploiting the coupling, this third way does not enable the rotation speed $\Omega$ to be measured directly because the sensor provides the orientation $\phi$ of the vibration plane. This operation in gyroscope mode is beneficial in some applications, and also enables the speed to be determined by means of a differentiator circuit ($\Omega=d\phi/dt$).

For each of the above three ways of exploiting the coupling between the two vibration modes of the resonator, the accuracy of the measurement supplied by the rate gyro depends on the quality of the vibrations of the two modes. To be more precise, for each of the modes, it is preferable for the quality factor Q to be high, enabling mechanical phenomena resulting from Coriolis accelerations to be amplified. For one resonator the Q-factor is defined as the quotient of the energy stored in the resonator divided by the energy loss during one period of the vibration. The Q-factor depends on a plurality of parameters. Firstly, the nature of the material used to fabricate the resonator conditions the mechanical energy losses by internal friction. For this reason the material is advantageously quartz or silicon, for which these losses are small, and which further have the benefit of a low acquisition cost. A second parameter influencing the Q-factor is the nature of the vibration of the resonator. For example, if the resonator is a beam vibrating flexionally, the Q-factor depends on exchanges of heat between the fibers that are alternately stretched and compressed, and this value is therefore proportional to the square of the thickness of the beam. These first two parameters determine what might be called the "intrinsic" quality factor Q of the resonator. In practice, the real Q-factor of the resonator is at most equal to this intrinsic factor, because it is generally affected by other influencing parameters, in particular the means of fixing the resonator to a support. It is desirable for the fixing means to avoid mechanical energy leakages from the resonator to the support. To be more precise, it is desirable to limit these energy leakages to a level related to the intrinsic quality factor of the resonator. For example, to obtain the greatest benefit from a resonator whose intrinsic quality factor is $3\times10^5$, it is necessary for the fixing means to limit energy leakages in each period to a value significantly lower than $(3\times\times10^5)^{-1}$ times the energy stored in the resonator. To this end, the fixing means can consist of a fixed part and a mechanical system connecting the resonator to the fixed part and reducing sufficiently leakages of mechanical energy from the resonator to the fixed part. The device therefore performs a function of mechanically filtering vibrations of the resonator. The fixed part is therefore little affected by the vibrations of the resonator. Accordingly, when the fixed part is fixed to a support, for example glued to the support, the mechanical energy leakages to the support can be sufficiently small. The resonator, the fixed part and the mechanical filtering system constitute a rate gyro structure.

The rate gyro structure is preferably monolithic, which avoids the drawbacks inherent to assemblies of several components, such as behavior that is unstable in time or in the event of temperature variations.

The monolithic structure of the rate gyro is preferably machined from a plate of material of uniform thickness, which enables it to be fabricated at low cost by chemical machining.

The resonator is preferably a tuning fork formed of two identical and parallel branches facing each other and each fixed at one end to a common part. One of the vibration modes is a flexional mode, in which the two branches vibrate flexionally in phase opposition, the vibratory displacements of the two branches being parallel to the plane of the plate of material. This vibration mode is therefore similar to that of a musical tuning fork. The other vibration mode is a torsional mode, in which the two branches vibrate flexionally in phase opposition, the vibratory displacements of the two branches occurring perpendicularly to the plane of the plate. The vibration directions of the two modes are therefore mutually perpendicular, and coupling occurs between the two modes if the tuning fork is subjected to rotation about an axis parallel to the two branches. That axis is called the sensitivity axis of the rate gyro. The benefit of choosing a tuning fork as the resonator is that the mechanical energy remains spontaneously localized in the resonator for the bending mode, the vibratory mechanical forces exerted by the two branches where they are "built into" the common part balancing out in the area of that common part near these build-ins. For this flexional mode, the mechanical energy leakages can therefore be reduced sufficiently by fixing the tuning fork to a support in an area of the common part sufficiently far away from the build-ins of the branches. On the other hand, this type of fixing would not be suitable for the torsional mode, because the support would be loaded by a torque alternating at the frequency of the torsional vibration and this would lead to high leakages of mechanical energy to the support.

To solve this problem of mechanical energy leaks in the torsional mode of the tuning fork, U.S. Pat. No. 5,166,571 proposes an H-shaped rate gyro structure which can be considered as consisting of two tuning forks sharing the same common part. FIGS. 1A and 1B show the greatly enlarged vibrational deformations of this structure for the flexional and torsional modes, respectively. From the theoretical point of view, the concept is beneficial because it seeks to have the vibrations of the four branches balance out for each of the two modes. In practice this solution has a drawback relating to the fixing of the structure, because the common portion 30a is subjected to flexional and torsional vibratory deformations which prevent it from being fixed directly to a support without causing high leakages of mechanical energy. Using the H-shaped structure therefore calls for additional mechanical retaining means, such as the fixing projecting part 78 shown in FIG. 1C, which has the drawback that it no longer benefits from the quality and low cost of manufacture of a plane monolithic device.

Still with the aim of solving the problem of mechanical energy leakages in the torsion mode of the resonator, it might seem beneficial to take inspiration from the monolithic quartz acceleration transducer structure proposed in the assignee's French patent No. 2,739,190 and shown in FIG. 2A. Unlike the known rate gyro previously described, this transducer is designed to measure acceleration and must therefore be relatively insensitive to rotation. From the structural point of view, the transducer shown in FIG. 2A has a monolithic structure comprising a fixed part 1, a resonator 3 fastened at both ends to a mobile mass part 2 serving as a test mass and a second mass part 4, respectively. First connecting means each connect the first mass part to the mobile second mass part and consist of two short blades 81 and 82 (H8<<H3) with a high flexural stiffness. The blades are vertically aligned with the middle of the length of the resonator 3 and the mobile parts 2 and 4 are consequently U-shaped. Also, the blades 81 and 82 have a thickness E8 significantly less than the thickness E of the plate. The blades 81 and 82 are equivalent to relatively rigid hinges between the mobile parts in the plane of symmetry PS containing the sensitive direction perpendicular to the plate and rigid connections in the plane PM of the plate. Second connecting means each connect the second mobile mass part to the fixed part and consist of a flexible frame 5 around the mass parts 2 and 4, a first connecting member 6 connecting the frame 5 to the second mass part 4, and a second connecting member 7 connecting the frame 5 to the fixed part 1. The fixed part is fixed to a housing base BA. The resonator 3 is a parallelepiped-shaped blade preferably vibrating flexionally or torsionally, because the frequencies of such vibrations are highly sensitive to the tensile or compression force exerted longitudinally on the resonator when the test mass 2 is subjected to an acceleration. Measuring the frequency of the resonator 3 by means of an appropriate device (not shown) therefore determines the acceleration applied to the transducer. This sensitivity of the frequency of the resonator to longitudinal forces is enhanced if the thickness of the parallelepiped-shaped blade constituting the resonator is reduced. In contrast, this reduction in the thickness of the blade reduces its intrinsic quality factor. Seeking a satisfactory compromise leads to an intrinsic quality factor of the order of $10^4$, a relatively modest value for a quartz resonator. FIG. 2B shows the greatly enlarged vibratory deformation of the structure of this transducer when the resonator is vibrating torsionally about its longitudinal axis. As explained in the French patent No. 2,739, 190 already cited (page 22, line 6–page 23, line 13), the rotational inertia of the mass parts 2 and 4 and the torsional flexibility of the flexible frame 5 characterize a mechanical filter between the resonator 3 and the fixed part 1 of the transducer; said fixed part is only very slightly loaded by the vibrations of the resonator. The alternating forces acting on the fixed part consist primarily of a torque t whose intensity is very much less than that of the torque T applied by the resonator to each of the mass parts 2 and 4. This limits energy leakages in each period of the vibration to a value significantly less than $10^{-4}$ times the energy stored in the resonator. Accordingly, as previously explained, the efficacy of the mechanical filtering performed by this device is well suited to the relatively modest intrinsic quality coefficient of the resonator, as a result of which the acceleration transducer works well. However, this mechanical filtering device would not be satisfactory for a rate gyro structure in which, as previously explained, it is desirable for the intrinsic quality coefficient of the resonator to be high, for example equal to $3\times10^5$. In this case, it is therefore desirable for the mechanical filtering device to limit energy leakages in each period of the vibration to a value significantly lower than $(3\times10^5)^{-1}$ times the energy stored in the resonator. If the masses and the stiffnesses of the device shown in FIGS. 2A and 2B were adapted to obtain this significantly increased efficacy, this would lead to disadvantages concerning the difficulty of defining and producing the rate gyro structure, as explained below. In the French patent No. 2,739,190 already cited, it is indicated (page 23, lines 29 to 36) that the mechanical filtering device is effective at the frequency of the resonator (a few tens of kHz) and that the mechanical strength of the transducer is not degraded in the working pass-band (from D.C. up to a few hundred Hz). This indicates that the frame 5 shown in FIGS. 2A and 2B is sufficiently flexible at a few tens of kHz and sufficiently rigid at a few hundreds of Hz, and also that the mechanical filtering device can be considered in a simplified way as a filtering suspension whose resonant frequency Fs is a few kHz, around ten times less than the frequency F of the resonator. The suspension frequency Fs is the lowest resonant frequency of the transducer structure. Because of its relative complexity, the structure has a number of resonant frequencies between Fs and F, and the density of the spectrum of these resonant frequencies increases with the frequency values. Correct operation of the resonator requires avoiding a close spacing between its resonant frequency F and a structure resonant frequency. The lower the frequency F, the easier it is to comply with this constraint. On the other hand, the efficacy of the filtering suspension increases as the frequency F increases, as indicated by the following approximate equation relating the total alternating torque 2T applied by the resonator to the mobile assembly consisting of the mass parts 2 and 4, and the alternating torque t received by the fixed part 1:

$$t/2T \approx Fs^2/F^2$$

In practice, it is desirable for the frequency F of the resonator not to exceed about ten times the lowest frequency Fs of the structure, because the geometry of that structure can then be defined with manufacturing tolerances that are sufficiently large to be compatible with a low fabrication cost. This condition is satisfied for the acceleration transducer shown in FIGS. 2A and 2B, for which the torque t received by the fixed part is therefore around 100 times smaller than the total torque 2T applied by the resonator at its "build-ins". Regarding the use of this type of filtering suspension in a rate gyro structure, however, it will have been understood that the need for significantly increased efficiency would lead to the resonator being operated at a frequency F significantly greater than ten times the lowest frequency Fs of the structure; the consequences of this would include problems with designing and fabricating the rate gyro structure and therefore an increase in its fabrication cost.

OBJECT OF THE INVENTION

The present invention proposes a geometrical form for a monolithic rate gyro structure which, whilst sufficiently limiting vibratory mechanical energy leaks from the resonator to the fixed part, is better suited to the industrial requirements for high-performance low-cost rate gyros.

SUMMARY OF THE INVENTION

According to the invention, this monolithic rate gyro structure, comprising a fixed part, a resonator, a first mobile mass part fastened to one end of the resonator, a second mobile mass part, first connecting means connecting the first mobile mass part to the second mobile mass part, and second connecting means connecting the second mobile mass part to the fixed part, is characterized in that the second mobile mass part is not fastened to the resonator and is situated in the vicinity of the other end of the resonator, the first connecting means comprise first two flexible arms which extend along the whole of the resonator on respective opposite sides thereof, and the second connecting means comprise second two flexible arms which extend along the first flexible arms and connect the second mobile mass part directly to the fixed part.

This disposition of masses and stiffnesses between the resonator and the fixed part achieves sufficiently effective mechanical filtering whilst causing the resonator to operate at a frequency F that does not exceed about ten times the lowest frequency Fs of the structure. This facilitates designing and fabricating the structure and reduces its fabrication cost.

According to a preferred embodiment, the fixed part consists of two parts situated along edges of the second two flexible arms which are opposite edges of the second flexible arms facing the first two flexible arms.

Preferably, the resonator is a tuning fork formed of two identical and parallel branches facing each other and each fastened at one end to a common part, the first mobile mass part being fastened to the resonator in the vicinity of the area of said common part at the greatest distance from said branches.

The rate gyro structure has an axis of symmetry to obtain the maximum efficiency of mechanical filtering.

Preferably, the lowest frequency of vibration of resonance of the gyro structure about said axis of symmetry is substantially equal to the lowest frequency of vibration of resonance of said structure, and the frequency of the resonator is equal to approximately ten times said lowest frequency of vibration of resonance of said structure.

BRIEF DESCRIPTION OF THE DRAWINGS

Other features and advantages of the invention will become more clearly apparent on reading the following detailed description and from the accompanying drawings, in which:

FIGS. 1A, 1B and 1C are perspective views of prior art rate gyro structures already commented on;

FIGS. 2A and 2B are perspective views of a prior art acceleration transducer structure already commented on;

DESCRIPTION OF THE PREFERRED EMBODIMENTS

Figure 3:
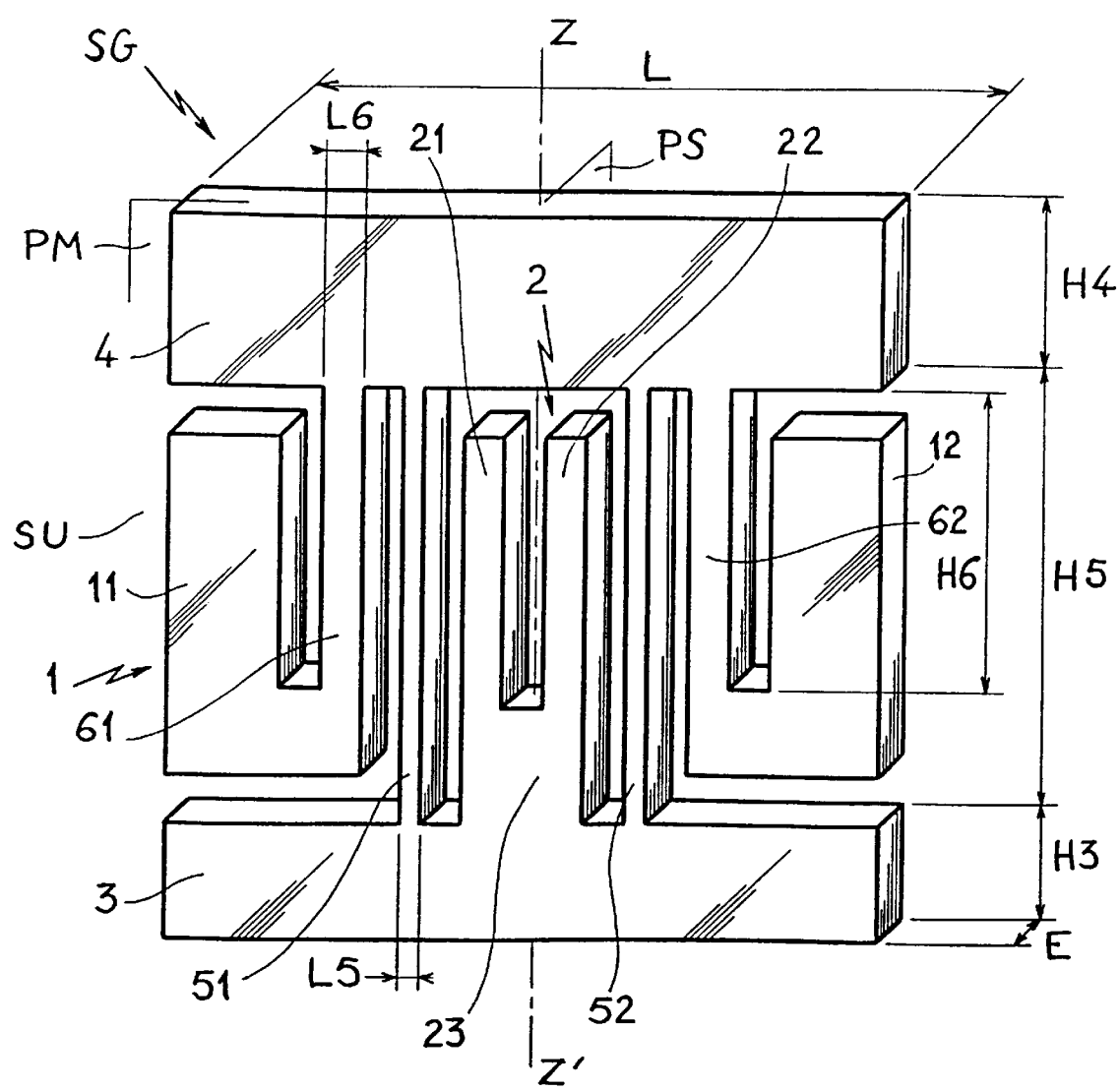
FIG. 3 is a perspective view of a first embodiment of a rate gyro structure according to the invention.

Referring to FIG. 3, a rate gyro structure SG according to the invention comprises a fixed part 1 consisting of two parts 11 and 12, a resonator 2, a first mass mobile part 3, a second mobile mass part 4, first two flexible arms 51 and 52, and second two flexible arms 61 and 62. In the embodiment shown in FIG. 3, the rate gyro structure SG constitutes a monolithic body machined in the same plate of material, such as quartz or silicon, of uniform thickness E, width L and height H4+H5+H3 along a central axis Z'Z. The axis Z'Z is contained in a median plane PM of the plate parallel to its faces and in a plane PS perpendicular to the faces of the plate. The planes PM and PS are planes of symmetry of the plate and planes of symmetry of the rate gyro structure. The axis Z'Z is therefore an axis of symmetry of the rate gyro structure.

In the embodiment illustrated in FIG. 3, the parts 11 and 12, the resonator 2, the first mobile mass part 3, the second mobile mass part 4, the first two flexible arms 51 and 52, and the second two flexible arms 61 and 62 all have a thickness E equal to that of the plate of material. This means that the chemical machining required to fabricate the monolithic body of the rate gyro structure SG is very simple. The chemical machining can be effected through the plate either from only one of the two faces of the plate or from both faces simultaneously, to an etching depth of E/2. At the scale of the structures implemented in the present invention, this chemical machining technique does not enable rigorous control of the dimensions of the various component parts. The skilled person will realize that this lack of accuracy must be taken into account in interpreting certain descriptive terms, for example the widths and thicknesses of the components or the symmetry of the structure.

The parts 11 and 12 constituting the fixed part are disposed at the two ends of the rate gyro structure, on respective opposite sides of the plane PS, and are intended to be fastened to the structure of an engine (not shown) by means of a support SU. The parts 11 and 12 are fixed to the support SU, for example glued to it.

In the embodiment illustrated, the resonator 2 is a tuning fork formed of two identical and parallel branches 21 and 22 facing each other on respective opposite sides of the plane PS and each fastened at one end to a common part 23. The axis Z'Z is a longitudinal axis of symmetry of the resonator 2.

The first mobile mass part 3 constitutes a parallelepiped-shaped block of thickness E, width L and height H3 disposed at one end of the rate gyro structure along the axis Z'Z and is fastened to the resonator 2 in the vicinity of the area of the common part 23 at the greatest distance from the branches 21 and 22. Accordingly, as previously explained, mechanical energy leakages to the first mobile mass part 3, and therefore all the more importantly to the fixed part, can be sufficiently reduced for the flexional mode of the tuning fork. In the embodiment shown, the inertia in rotation of the first mobile mass part 3 about the axis Z'Z is much greater than that of the resonator 2.

The second mobile mass part 4 constitutes a parallelepiped-shaped block of thickness E, width L and height H4 disposed at the other end of the rate gyro structure along the axis Z'Z. The second mobile mass part 4 is therefore in the vicinity of the free ends of the branches 21 and 22 of the resonator 2. In the embodiment shown, the height H4 of the second mobile mass part 4 is greater than the height H3 of the first mobile mass part 3; the height H4 is generally from once to three times the height H3. The rotation inertia of the second mobile mass part 4 about the axis Z'Z is therefore greater than that of the first mobile mass part 3.

Still referring to the embodiment shown in FIG. 3, each of the first two flexible arms 51 and 52 constitutes a parallelepiped-shaped beam whose height H5 is parallel to the axis Z'Z and is greater than that of the resonator 2 parallel to the axis Z'Z and whose rectangular cross section is defined by a thickness E and a width L5 respectively in the direction of the thickness E and the width L of the rate gyro structure SG. In the embodiment shown, the width L5 of each of the first two flexible arms is less than its thickness E; L5 generally lies between ⅓ and ¾ the thickness E. On the other hand, the height H5 of each of the first two flexible arms is significantly greater than its thickness E; H5 generally lies between 5 and 25 times the thickness E. The first two flexible arms 51 and 52 are disposed on respective opposite sides of the resonator 2 so that one side of each of the first two flexible arms parallel to the plane PS faces one of the exterior sides of the resonator parallel to the plane PS.

Each of the first two flexible arms is fastened at both ends to the first mobile mass part 3 and the second mobile mass part 4, respectively. Accordingly, the first two flexible arms 51 and 52 and the first and second mobile mass parts 3 and 4 form the four branches of a "II" around the resonator 2. The first two flexible arms 51 and 52 can have structures other than that of the parallelepiped-shaped beam of the embodiment shown in FIG. 3. For example, the width L5 can change continuously or discontinuously along the height H5 of the first two flexible arms 51 and 52. The first two flexible arms 51 and 52 need not be parallel to the axis Z'Z; what is important is that their flexibility enables rotations in phase opposition of the first and second mobile mass parts 3 and 4 about the axis Z'Z.

Still referring to the embodiment shown in FIG. 3, each of the second two flexible arms 61 and 62 constitutes a parallelepiped-shaped beam whose height H6 is parallel to the axis Z'Z and significantly less than that of the resonator and whose rectangular cross section is defined by a thickness E and a width L6 respectively in the direction of the thickness E and the width L of the rate gyro structure SG. In the embodiment shown, the width L6 of each of the second two flexible arms is of the same order of magnitude as its thickness E; L6 is generally from half to twice the thickness E. On the other hand, the height H6 of each of the two second flexible arms is significantly greater than its thickness E; H6 generally lies between three and ten times the thickness E. In the embodiment shown, the width L6 of each of the second two flexible arms 61 and 62 is greater than the width L5 of each of the first two flexible arms 51 and 52, and the height H6 of each of the second two flexible arms 61 and 62 is less than the height H5 of each of the first two flexible arms 51 and 52. The first two flexible arms 51 and 52 are therefore more flexible in bending than the second two flexible arms 61 and 62. The second two flexible arms 61 and 62 are disposed on respective opposite sides of the plane PS so that each of them is situated between one of the first two flexible arms 51 and 52 and one of the two parts 11 and 12 constituting the fixed part. Accordingly, each of the second two flexible arms extends along one of the first two flexible arms. Each of the second two flexible arms 61 and 62 is fastened at one end to the second mobile mass part 4 and at the other end to one of the two parts 11 and 12 in the vicinity of the end section of said part 11 or 12 facing the first mobile mass part 3. Like the first two flexible arms 51 and 52, the second two flexible arms 61 and 62 can have structures other than that of the parallelepiped-shaped beam of the embodiment shown in FIG. 3. The second two flexible arms 61 and 62 need not be parallel to the axis Z'Z; what is important is that their flexibility allows rotations of the second mobile mass part 4 about the axis Z'Z.

Figure 1A:
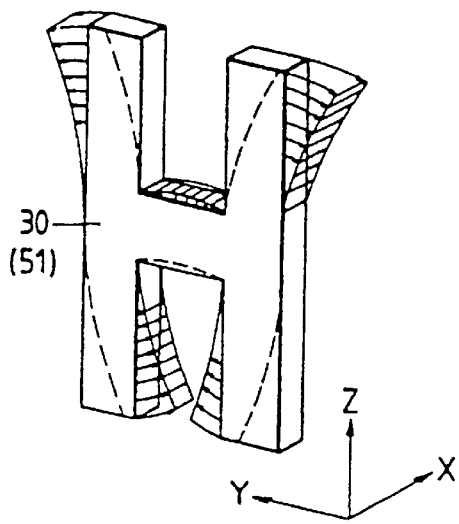
Figure 1B:
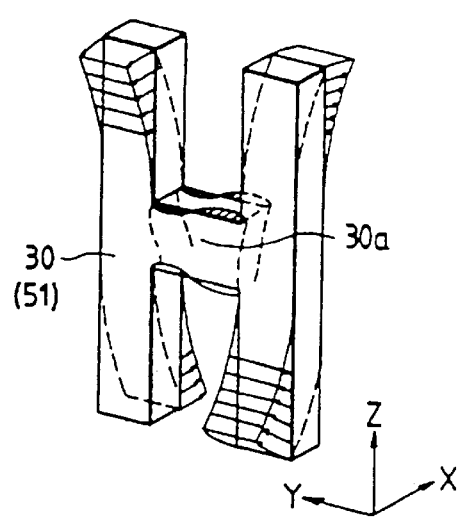
Figure 1C:
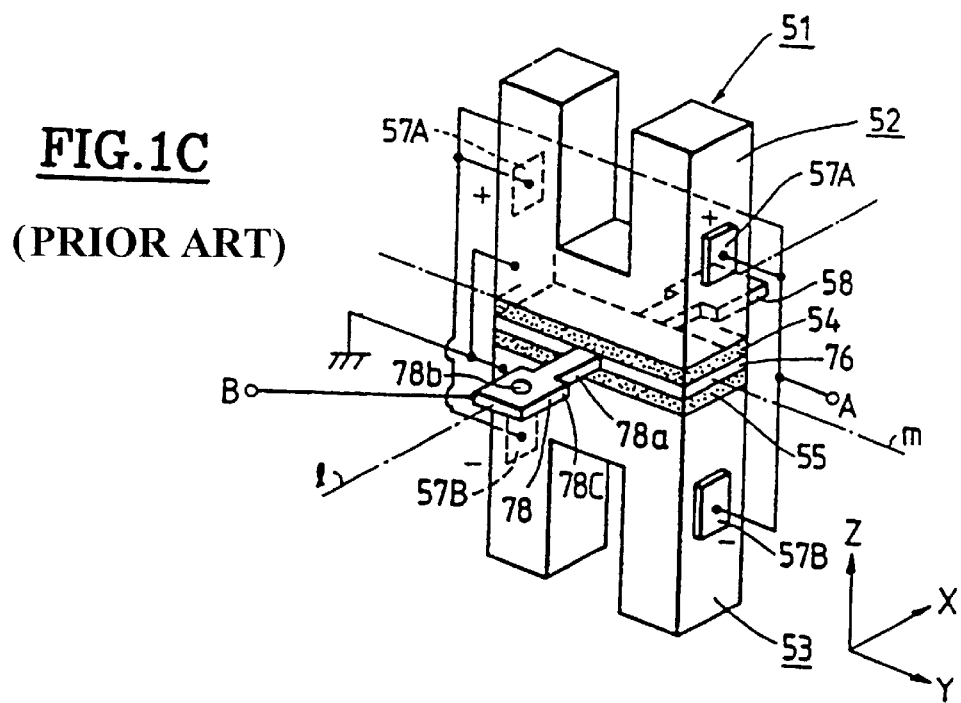
Figure 2A:
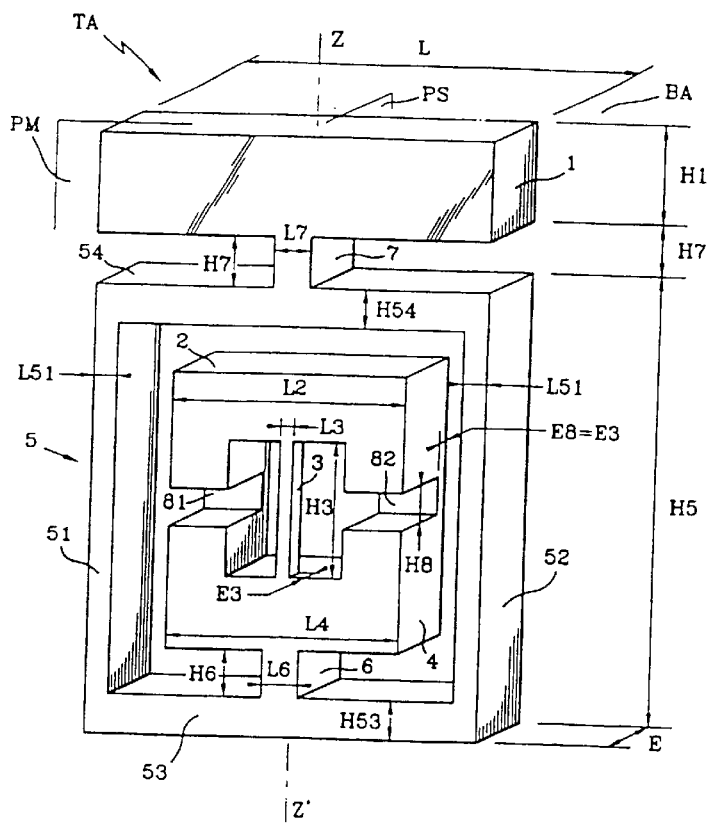
Figure 2B:
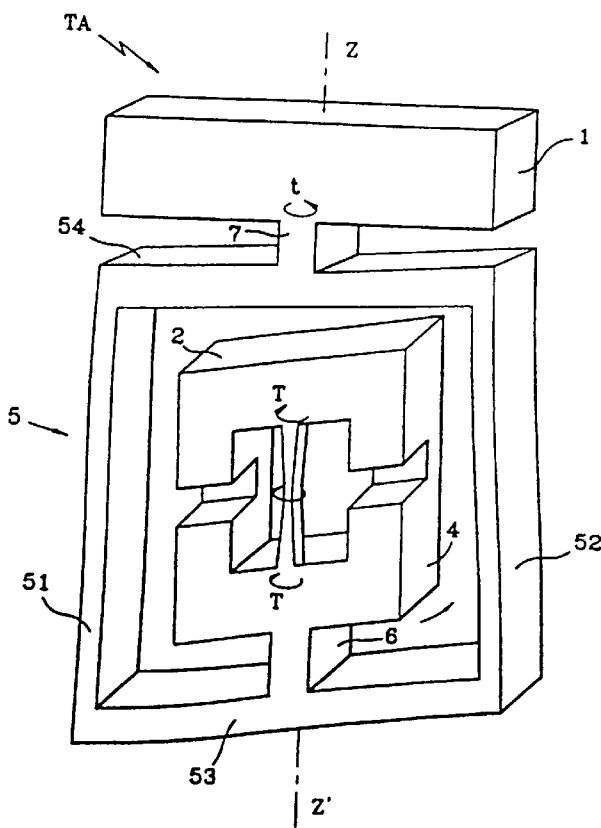
Figure 4:
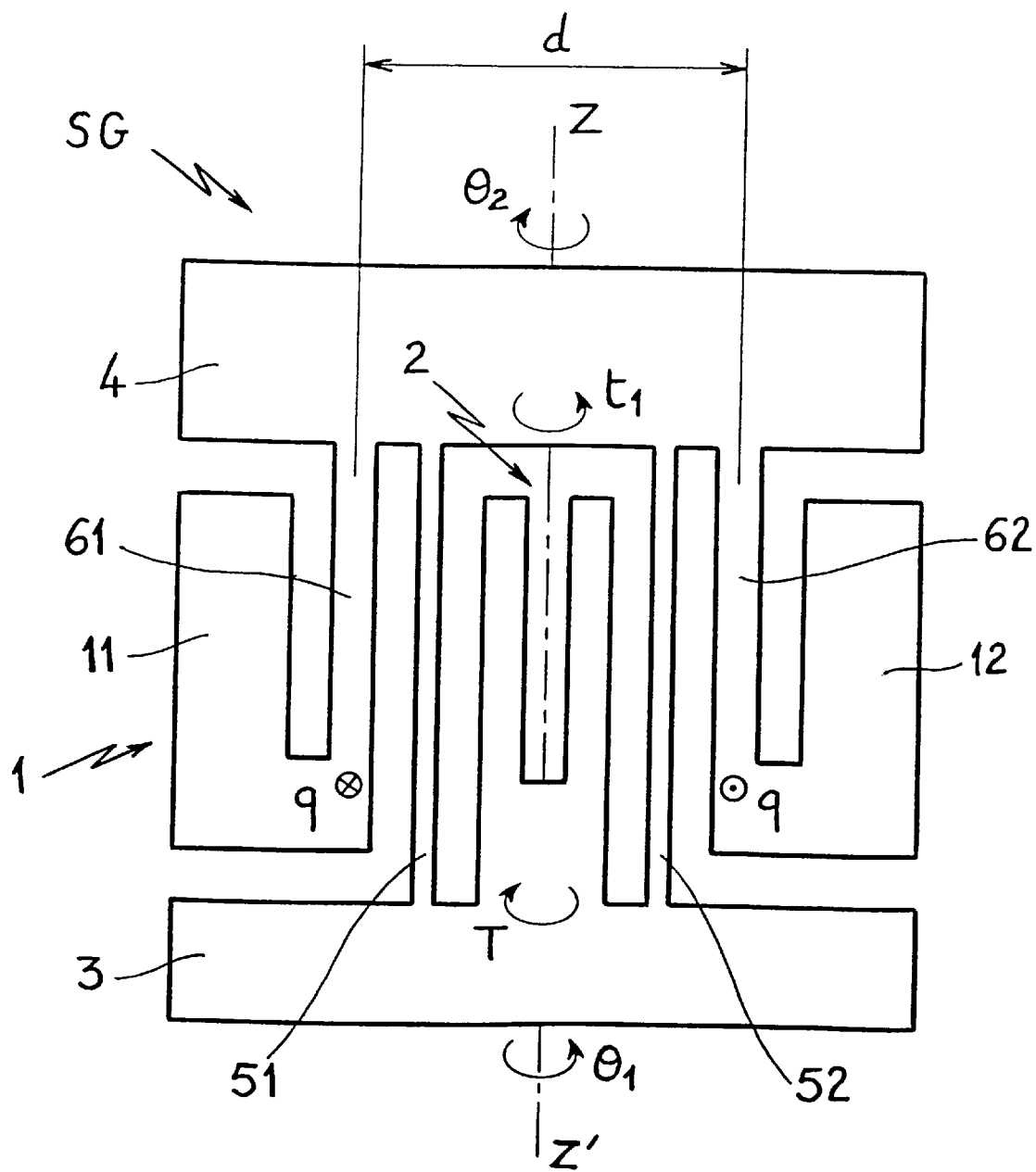
FIG. 4 is a front view of the rate gyro structure from FIG. 3 showing mechanical forces and movements caused by the torsional vibration of the resonator.

The operation of the rate gyro structure according to the invention is described next with reference to FIG. 4, which shows mechanical forces and movements caused by the torsional vibration of the resonator. FIG. 4 is a front view of the rate gyro structure SG from FIG. 3. When the resonator 2 is subject to torsional vibration about its longitudinal axis Z'Z, it applies an alternating torque T to the first mobile mass part 3 which is therefore subjected to an alternating rotation $\theta_1$ about the axis Z'Z, which is a main axis of inertia of said mass part 3, said rotation $\theta_1$ being in phase opposition with the alternating torsion movement of the resonator 2. The moment of inertia $J_1$ in rotation of the first mobile mass part 3 about the axis Z'Z being much greater than that of the resonator 2, the amplitude of the alternating rotation $\theta_1$ of said mass part is much smaller than the amplitude of torsional vibration of the resonator 2. This small alternating rotation $\theta_1$ creates forced flexional vibrations of low amplitude of the first two flexible arms 51 and 52, said forced vibrations being in phase opposition between them and therefore producing an alternating overall torque $t_1$ on the second mobile mass part 4. Said first flexible arms 51 and 52 being flexible in flexion, the intensity of the torque $t_1$ is very much less than that of the torque T applied by the resonator to the first mobile mass part 3. The alternating torque $t_1$ causes an alternating rotation $\theta_2$ of the second mobile mass part 4 about the axis Z'Z which is a main axis of inertia of said mass part 4, said rotation $\theta_2$ being in phase opposition with the alternating rotation $\theta_1$ of the first mobile mass part 3. The intensity of the torque $t_1$ being low and the moment of inertia $J_2$ in rotation of the second mobile mass part 4 about the axis Z'Z being high, the amplitude of the alternating rotation $\theta_2$ of the second mobile mass part 4 is very much less than that of the alternating rotation $\theta_1$ of the first mobile mass part 3. This very small alternating rotation $\theta_2$ creates forced flexional vibrations of very low amplitude of the second two flexible arms 61 and 62, said forced vibrations being in phase opposition, the main consequence of which is the production of alternating forces q of very low intensity perpendicular to the faces of the plate of material and in opposite directions of the parts 11 and 12, respectively. The parts 11 and 12 constituting the fixed part, said fixed part is therefore subjected to a very low overall alternating torque $t_2$ whose intensity is substantially equal to q×d, where d is the distance between the second two flexible arms 61 and 62. The intensity of the overall alternating torque $t_2$ on the fixed part is therefore very much less than that of the overall alternating torque $t_1$ on the second mobile mass part 4, the intensity of said torque $t_1$ being itself very much less than that of the alternating torque T applied to the first mobile mass part 3 by the torsional vibrations of the resonator 2. It is clear that the mechanical filtering system of the rate gyro structure according to the invention can be regarded as the association of two filtering suspension systems disposed "in series" and that it is therefore possible to obtain mechanical filtering that is significantly more efficient than that achieved by the FIG. 2A prior art acceleration transducer structure. It will also have been noted that the symmetry about the axis Z'Z of the rate gyro structure according to the invention makes the main axes of inertia of the first and second mobile mass parts 3 and 4 coincident, which reduces the amplitudes of the forced flexional vibrations of the flexible arms 51, 52, 61 and 62, which is favorable to efficient mechanical filtering.

However, this series association of two filtering suspensions, referred to hereinafter as a "double filtering suspension", is not in itself satisfactory to define the rate gyro structure according to the invention which, whilst providing increased mechanical filtering, is such that the frequency F of the resonator does not exceed a value equal to about ten times the lowest frequency Fs of the structure, so that the design and fabrication of said structure are facilitated and its fabrication cost reduced, as previously explained. It is the compact nature of the disposition of the two filtering suspensions of the structure according to the invention that enables this result to be obtained. If this disposition were not compact, for example if the resonator 2, the first mobile mass part 3, the first two flexible arms 51 and 52, the second mobile mass part 4 and the second two flexible arms 61 and 62 were staggered in that order along the axis Z'Z, the lowest frequency Fs of the structure would correspond to an overall flexional mode of no utility for mechanical filtering, the useful frequency being the lowest frequency $Fs_1s_2$ of vibration of the double filtering suspension about the axis Z'Z; the useful frequency $Fs_1s_2$ would therefore have a value lying between Fs and F, for example $Fs_1s_2=2Fs=F/5$; the efficiency of the double filtering suspension increases as the difference between $Fs_1s_2$ and F increases, so that for this example, which conforms to the condition F=10 Fs, the "staggered" disposition of the structure along the axis Z'Z would not provide the benefit of the maximum mechanical filtering authorized by the design concept. According to the invention, the compact disposition of the two filtering suspensions means that the useful frequency $Fs_1s_2$ is close to the lowest frequency Fs of the rate gyro structure, which provides the benefit of increased mechanical filtering, whilst causing the resonator to operate at a frequency F that does not exceed about ten times the lowest frequency Fs of the structure. This compact disposition of the two filtering suspensions of the rate gyro structure according to the invention is characterized in that the second mobile mass part 4 is in the vicinity of the free end of the resonator 2 and the resonator 2 and the four flexible arms 51, 52, 61 and 62 are situated at substantially the same level along the axis Z'Z.

To obtain the maximum benefit from the rate gyro structure according to the invention, the inertias of the mobile mass parts 3 and 4 and the flexibilities of the flexible arms 51, 52, 61 and 62 preferably satisfy certain equations, as explained hereinafter with reference to FIG. 3. It will have been understood that the double filtering suspension of the structure according to the invention is made up of a first filtering suspension comprising the first mobile mass part 3 and the first two flexible arms 51 and 52 and a second filtering suspension comprising the second mobile mass part 4 and the second two flexible arms 61 and 62. For each of the two filtering suspensions it is possible to define a natural frequency of vibration about the axis Z'Z by considering the imaginary case in which the end of each of the two flexible arms opposite the end fastened to the mobile mass part is built-in; the natural frequencies $Fs_1$ and $Fs_2$ for the first and second filtering suspensions, respectively, are defined in this way. The value of each of said natural frequencies $Fs_1$ and $Fs_2$ is determined as a function of the moment of inertia in rotation about the axis Z'Z of the corresponding mobile mass part, respectively $J_1$ and $J_2$, as previously defined, and the overall angular stiffness of the corresponding two flexible arms with respect to rotation of the corresponding mobile mass part about the axis Z'Z, respectively $C_1$ for the first two flexible arms and $C_2$ for the second two flexible arms. The following equations therefore apply:

$$Fs_1 \approx \frac{1}{2\pi}\sqrt{\frac{C_1}{J_1}} \text{ and } Fs_2 \approx \frac{1}{2\pi}\sqrt{\frac{C_2}{J_2}}$$

Despite their imaginary nature, the above two natural frequencies are of interest because they appear in the processing of the equations that reflect the mechanical behavior in vibration of the rate gyro structure according to the invention; the natural frequencies $Fs_1$ and $Fs_2$ can therefore be considered as parameters for optimizing the dimensions of said rate gyro structure. Seeking optimization shows that it is advantageous, for efficient mechanical filtering, for the average of the natural frequencies $Fs_1$ and $Fs_2$ to be approximately equal to one fifth of the frequency F of the resonator, and for the natural frequency $Fs_2$ to be from once to three times the natural frequency $Fs_1$. Moreover, it is equally advantageous for the moment of inertia $J_2$ of the second mobile mass part 4 to be from once to three times the moment of inertia $J_1$ of the first mobile mass part 3, and for the overall angular stiffness $C_2$ of the second two flexible arms 61 and 62 to be from twice to ten times the overall angular stiffness $C_1$ of the first two flexible arms 51 and 52.

Figure 5:
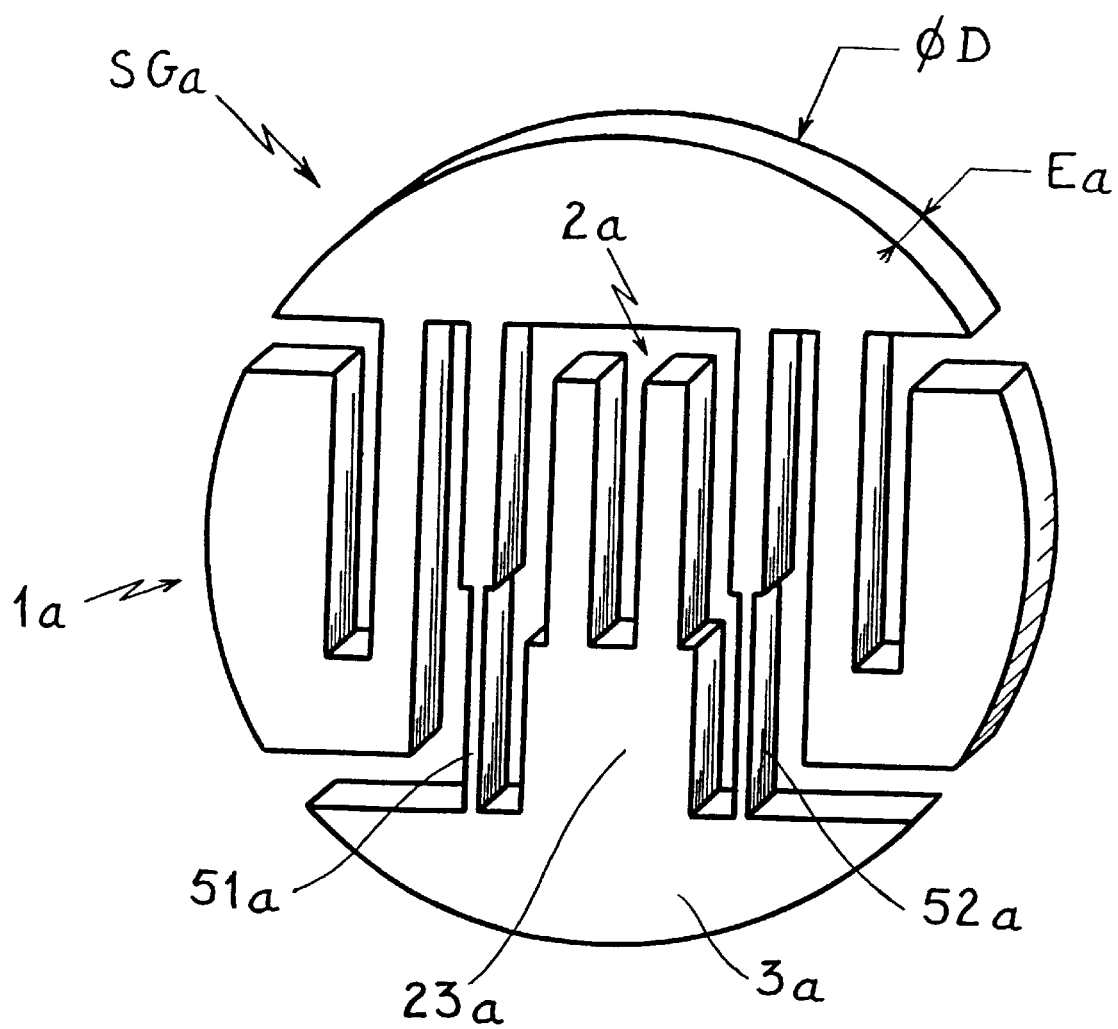
FIG. 5 is a perspective view of a variant of a rate gyro structure according to the invention.

FIG. 5 shows another embodiment of a rate gyro structure according to the invention. The rate gyro structure SGa differs from the rate gyro structure SG shown in FIG. 3 principally in its generally disk-like shape, of diameter D and thickness Ea, the non-parallelepiped-shape of the first two flexible arms 51a and 52a, and the larger dimensions of the common part 23a of the tuning fork 2a in the direction parallel to the larger faces of the rate gyro structure. The disk-like general shape is well suited to the use of a cylindrical casing of small overall size to contain the rate gyro structure SGa. With regard to the non-parallelepiped shape of the first two flexible arms 51a and 52a, it can be seen that each of said flexible arms consists of two parallelepiped-shaped sections, which provides additional dimensional parameters to facilitate avoiding the frequency F of the resonator being close to a resonant frequency of the structure, for example. With regard to the greater dimensions of the common part 23a, this further improves the mechanical filtering of the flexional vibrations of the tuning fork 2a. Also, this embodiment shown in FIG. 5 has the benefit of the same advantages as the embodiment shown in FIG. 3 with regard to efficient mechanical filtering of flexional vibrations of the tuning fork and the low cost of fabrication. It is therefore possible to obtain a quartz rate gyro structure SGa in accordance with the invention of diameter D=9 mm, thickness Ea=0.5 mm, whose lowest frequency Fs is equal to 3 kHz, and whose resonator vibrates torsionally at 30 kHz and has an intrinsic quality factor of $3\times10^5$; the overall alternating torque to which the fixed part of said structure is subject, is more than one thousand times less than the alternating torque on the first mass part 3a caused by the torsional vibrations of the resonator 2a, as a result of which the real Q-factor of the resonator is practically equal to its intrinsic quality factor; moreover, the resonant frequencies of the structure are more than 5 kHz from the frequency of the resonator, which is clearly sufficient to enable correct operation of the resonator, whilst benefiting from sufficiently wide manufacturing tolerances to be compatible with a low fabrication cost.

What is claimed is:

1. A monolithic rate gyro structure machined in a plate of material, comprising a fixed part, a resonator, a first mobile mass part fastened to a first end of said resonator, a second mobile mass part, first connecting means connecting said first mobile mass part to said second mobile mass part, and second connecting means connecting said second mobile mass part to said fixed part, characterized in that said second mobile mass part is not fastened to said resonator and is situated in the vicinity of a second end of the resonator, said first connecting means comprise first two flexible arms which extend along the whole of said resonator on respective opposite sides thereof and said second connecting means comprise second two flexible arms which extend along the first flexible arms and connect said second mobile mass part directly to said fixed part.

2. A monolithic rate gyro structure according to claim 1, wherein said fixed part consists of two parts situated along edges of said second two flexible arms opposite edges of said second flexible arms facing said first two flexible arms.

3. A monolithic rate gyro structure according to claim 1, wherein said resonator is a tuning fork formed of two identical and parallel branches facing each other and each fastened at one end to a common part.

4. A monolithic rate gyro structure according to claim 1, wherein said first mobile mass part and said second mobile mass part each are a parallelepiped-shaped block whose thickness is equal to the thickness of the machined plate, and the height of said second mobile mass part lies between once and three times the height of said first mobile mass part.

5. A monolithic rate gyro structure according to claim 1, wherein each of said first two flexible arms is a parallelepiped-shaped beam whose thickness is equal to the thickness of the machined plate, whose width lies between ⅕ and ¾ said plate thickness, and whose height lies between 5 and 25 times said plate thickness.

6. A monolithic rate gyro structure according to claim 1, wherein each of said second two flexible arms is a parallelepiped-shaped beam whose thickness is equal to the thickness of the machined plate, whose width lies between half and twice said plate thickness, and whose height lies between three and ten times said plate thickness.

7. A monolithic rate gyro structure according to claim 5, wherein said width of each of said second two flexible arms is greater than the width of each of said first two flexible arms and the height of each of said second two flexible arms is less than the height of each of said first two flexible arms.

8. A monolithic rate gyro structure according to claim 1, having an axis of symmetry.

9. A monolithic rate gyro structure according to claim 8, wherein said second mobile mass part has a moment of inertia about said axis of symmetry lying between once and three times that of said first mobile mass part.

10. A monolithic rate gyro structure according to claim 9, wherein the lowest frequency of vibration of resonance of said structure about said axis of symmetry is substantially equal to the lowest frequency of vibration of resonance of said structure, and the resonant frequency of said resonator is equal to approximately ten times said lowest frequency of vibration of resonance of said structure.

11. A monolithic rate gyro structure according to claim 1, wherein said fixed part and resonator, said first mobile mass part, said second mobile mass part, said first two flexible arms and said second two flexible arms have a thickness equal to the thickness of the machined plate.

* * * * *